(12) United States Patent
Boldt et al.

(10) Patent No.: US 9,778,886 B2
(45) Date of Patent: Oct. 3, 2017

(54) ERROR HANDLING FOR PRINT WORKFLOWS

(71) Applicants: Gerald Donald Boldt, Longmont, CO (US); Janeen E. Jahn, Lafayette, CO (US); Ronald J LeMaster, Boulder, CO (US); Michael David Raines, Austin, TX (US)

(72) Inventors: Gerald Donald Boldt, Longmont, CO (US); Paul Hamilton, Louisville, CO (US); Janeen E. Jahn, Lafayette, CO (US); Kumar V. Kadiyala, Boulder, CO (US); Tisha Leggett, Boulder, CO (US); Ronald J LeMaster, Boulder, CO (US); Michael David Raines, Austin, TX (US); Patrick Smyth, Thornton, CO (US)

(73) Assignee: Ricoh Company, Ltd., Tokyo (JP)

( * ) Notice: Subject to any disclaimer, the term of this patent is extended or adjusted under 35 U.S.C. 154(b) by 620 days.

(21) Appl. No.: 13/776,075

(22) Filed: Feb. 25, 2013

(65) Prior Publication Data

US 2014/0240745 A1   Aug. 28, 2014

(51) Int. Cl.
*G06F 15/00* (2006.01)
*G06F 3/12* (2006.01)

(52) U.S. Cl.
CPC ............ *G06F 3/1234* (2013.01); *G06F 3/121* (2013.01); *G06F 3/1282* (2013.01); *G06F 3/1211* (2013.01); *G06F 3/1275* (2013.01)

(58) Field of Classification Search
None
See application file for complete search history.

(56) References Cited

U.S. PATENT DOCUMENTS

| | | | |
|---|---|---|---|
| 7,773,242 B2 | 8/2010 | Morales | |
| 8,320,008 B2 | 11/2012 | Jahn | |
| 2003/0107751 A1* | 6/2003 | Tanaka | 358/1.2 |
| 2005/0034030 A1 | 2/2005 | Wiechers | |
| 2010/0079789 A1 | 4/2010 | de Beus | |
| 2010/0168888 A1* | 7/2010 | Ryuutou | 700/97 |
| 2010/0245884 A1 | 9/2010 | Komine | |
| 2011/0249290 A1* | 10/2011 | Hayber et al. | 358/1.15 |

(Continued)

OTHER PUBLICATIONS

Onyx (Oct. 2011). Onyx graphics announces smartapps pitstop pro plug-in for adobe acrobat software. Retrieved from http://www.onyxgfx.com/index.php?area=viewinfo&action=article&id=58.

(Continued)

*Primary Examiner* — Helen Q Zong
(74) *Attorney, Agent, or Firm* — Duft Bornsen & Fettig LLP

(57) ABSTRACT

Methods and systems resume workflow processing of a print job at intermediate steps of a print workflow. In one embodiment, a control system initiates processing of a print job based on steps in a print workflow, where the steps identify print shop activities to perform for the print job. The control system identifies an error in executing a step of the workflow, and identifies an intermediate step in the workflow that has executed in processing the print job. The control system identifies an updated file for the print job to correct the error, and resumes the processing of the print job at the intermediate step using the update file.

18 Claims, 5 Drawing Sheets

(56) References Cited

U.S. PATENT DOCUMENTS

2012/0218590 A1*  8/2012  Dumitrescu et al. ........ 358/1.15
2012/0243028 A1*  9/2012  Dumitrescu et al. ........ 358/1.15
2012/0320407 A1  12/2012  Hoarau et al.

OTHER PUBLICATIONS

EFI (Apr. 2007). EFI's new fiery turns digital production print engines into most effective competitive weapons they can be. Retrieved from http://ir.efi.com/releasedetail.cfm?ReleaseID=455960.

EFI (Dec. 2012). EFI fiery jobflow. Retrieved from http://w3.efi.com/~/media/Files/EFI/Fiery/Fiery%20JobFlow/EFI_Fiery_JobFlow_Bro_US_HR.pdf.

* cited by examiner

ERROR HANDLING FOR PRINT WORKFLOWS

FIELD OF THE INVENTION

The invention relates to the field of printing systems and, in particular, to print workflows.

BACKGROUND

Print shops are typically medium or large scale facilities capable of supplying printing services to meet a variety of customer demands. For example, print shops are often used to print documents for mass-mailing (e.g., customer bills, advertisements, etc). Because print shops engage in printing on a scale that is hard to match, their customer base is usually varied. Print shop clients may therefore include both large institutional clients (e.g., credit card companies and banks), and small clients (e.g., small businesses and churches).

Print shops are generally arranged to print incoming jobs from clients in a way that is economical, yet fast. Thus, print shops often include a number of high-volume printers capable of printing incoming jobs quickly and at high quality. These printers may be managed by operators who can remove paper jams and reload the printers with media. Print shops also typically include post-print devices that are used to process the printed documents of each job (e.g., stackers, staplers, cutters, binders, etc.). Because print shops serve a variety of clients, they are often tasked with printing jobs that have varying printing formats, delivery dates, and media requirements. Print shops therefore often use a centralized print server that coordinates the activity between printers of the print shop and clients. The print server schedules incoming jobs and forwards them to the printers they are directed to.

Customers with printing needs generate print jobs for the print shop using a variety of tools, such as web interfaces to the print shop, client side tools operated by the customer, etc. When a customer generates a job for the print shop, options for the job are selected by the customer and integrated into the print job (e.g., a job ticket for the customer's print data indicates duplexing, media types, etc.) based on the capabilities and activities that the print shop offers to customers. A print shop operator then generates a print workflow for the print job. The print workflow includes sequences of steps that identify the print shop activities to perform for the print job. Such steps may include a variety of actions such as printing, stapling, generating billing for the customer, shipping, an email verification process for proof sheets, etc.

Some print workflows include a number of branches that allow error handling to occur outside of the main-line workflow. However, branching also increases the complexity of the print workflow, which may be difficult to implement without introducing new errors.

SUMMARY

Embodiments described herein provide for resuming workflow processing of a print job at intermediate steps within a print workflow. By resuming the processing at intermediate steps within the workflow, a job does not have to restart at the beginning of the workflow. This allows error handling to occur without the use of specialized branching workflows. For example, error processing for non-branching workflows may be implemented by resuming at an intermediate step in the workflow.

In one embodiment, a control system is operable to initiate processing of a print job based on steps in a print workflow. The steps in the workflow identify print shop activities to perform for the print job. The control system is further operable to identify an error in executing a step of the workflow, and to identify an intermediate step in the workflow that has executed in processing the print job. The control system is further operable to identify an updated file for the print job to correct the error, and to resume processing of the print job at the intermediate step using the updated file.

In another embodiment, a method is disclosed for resuming workflow processing of a print job at intermediate steps of the print workflow. The method comprises initiating a processing of a print job based on steps in a print workflow, where the steps identify print shop activities to perform for the print job. The method further comprises identifying an error in executing a step of the workflow, and identifying an intermediate step in the workflow that has executed in processing the print job. The method further comprises identifying an updated file for the print job to correct the error, and resuming the processing of the print job at the intermediate step using the updated file.

In another embodiment, a non-transitory computer readable medium embodies programmed instructions which, when executed by a processor, direct the processor to initiate processing of a print job based on step in a print workflow, where the steps identify print shop activities to perform for the print job. The instructions further direct the processor to identify an error in executing a step of the workflow, and to identify an intermediate step in the workflow that has executed in processing the print job. The instructions further direct the processor to identify an updated file for the print job to correct the error, and to resume the processing of the print job at the intermediate step using the updated file.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
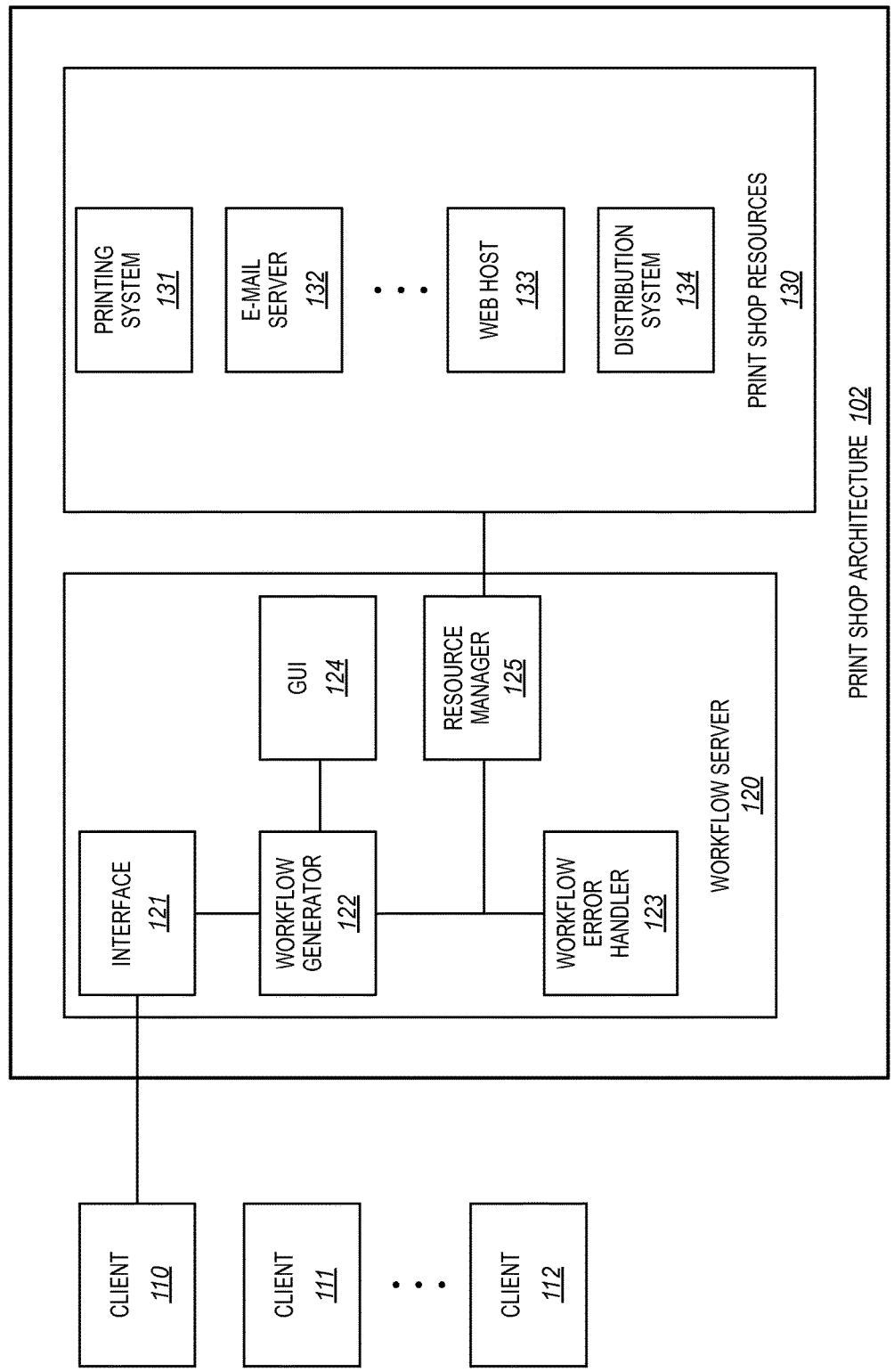
FIG. 1 is a block diagram illustrating a print shop architecture in an exemplary embodiment.

FIG. 1 is a block diagram illustrating a print shop architecture 102 in an exemplary embodiment. Print shop architecture 102 includes a workflow server 120, which functionally connects one or more clients 110-112 to print shop resources 130. Clients 110-112 may be servers or software applications used by print shop customers. Clients 110-112 submit print data and job tickets that describe how the print data will be processed to interface 121. Workflow server 120 generates workflows for incoming print jobs, handles any workflow related error conditions that may arise, and manages print shop resources 130 in accordance with these workflows.

Print shop resources 130 include the devices and components of the print shop that are used to perform print shop activities. For example, print shop resources 130 may include personnel, printers, post-printing machinery, e-mail or web publishing servers, media, ink, firmware versions for print shop devices, etc. Print shop resources 130 may exist within the confines of the print shop itself, or may comprise off-site devices and functional components managed by workflow server 120. The print shop resources 131-134 illustrated in FIG. 1 provide an example of the variety of print shop resources 130 that may be provided. For instance, print shop resources 130 may include printing system 131 for transforming print data onto a suitable printable medium, such as paper. Other resources may include e-mail server 132 for generating e-mails, web host 133 for generating and hosting web pages or other internet content, and distribution system 134 for packaging and shipping printed documents.

While in operation, workflow server 120 identifies the available activities that may be performed by print shop resources 130. Workflow server 120 may determine the available print shop activities based upon the nature of print shop resources 130. For example, when print shop resources 130 include e-mail server 132, then the available activities may include generating e-mails, scheduling times to send e-mails, and selecting e-mail recipients. The activities may be associated with a category or type of resource (e.g., personnel, printers, and/or servers) and may also be associated with specific named print shop resources (e.g., Susan, printing system 131, and/or e-mail server 132).

Innumerable print shop activities may be available, and certain print shop activities may be logically related with each other so that they have order and dependency relationships (e.g., a post-printing activity such as hole punching depends upon the print data being successfully printed). A print shop operator may prioritize activities (e.g., to ensure that billing is the last activity performed), and may make certain activities required (e.g., billing may be required for every print job that enters the system). Furthermore, certain activities may be required, altered, or made optional based upon specific clients, customers, or information in a job ticket of the print job (e.g., customer service requests, multimedia parameters, size of the print data, format of the print data, etc.). The logical relationships, permissible values, configurations, the number of instances, etc., of steps for a print workflow are hereinafter referred to as "workflow rules". In addition to printing activities, workflow rules may regulate non-printing activities (e.g., billing, shipping, document review, multimedia/digital/internet activities, credit checks, etc.). In order to aid an operator of the print shop in creating a print workflow for a print job, a Graphical User Interface (GUI) 124 is provided for manipulation of print workflows.

Once the activities that are available at architecture 102 have been determined, an operator utilizes GUI 124 in conjunction with workflow generator 122 to generate a print workflow for a print job. Resource manager 125 of workflow server 120 directs print shop resources 130 to perform the activities defined by the workflow for a given print job. Resource manager 125 identifies activities that relate to specific print shop resources 131-134 (e.g., the activity "e-mail the client a printing status report" may relate to e-mail server 132), and instructs the specific resources to perform the identified activities. Resource manager 125 may also receive feedback from print shop resources 130 (e.g., information indicating that an activity has successfully completed).

In some cases, error conditions arise while processing a job using a print workflow. For instance, data may be missing from the job (e.g., font information), a workflow rule may be violated (e.g., when a step in the workflow modifies the print data such that a subsequent preflight step fails validation), etc. Errors that arise during workflow processing of a print job are generally resolved by a workflow error handler 123. In this embodiment, workflow error handler 123 allows for updated job data and/or job tickets for a print job to be used to correct the error(s) and resume processing of a print job at intermediate points in the print workflow. Workflow error handler 123 therefore allows job errors to be corrected and workflow processing to resume without restarting the processing of the print job at the beginning of the workflow.

Figure 2:
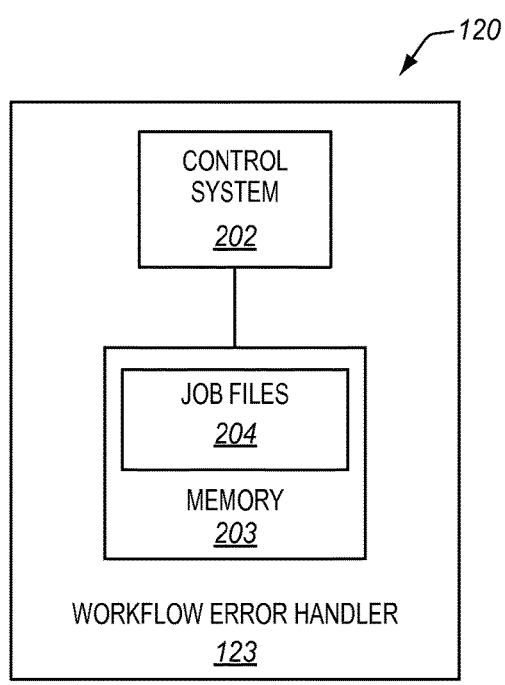
FIG. 2 is a block diagram illustrating additional details for a workflow server of the architecture of FIG. 1 in an exemplary embodiment.

Consider that workflow server 120 receives a print job from one of clients 110-112 for processing by print shop architecture 102. A print workflow is identified and/or created for processing the print job at print shop architecture 102. FIG. 2 is a block diagram illustrating additional details for workflow error handler 123 of FIG. 1 in an exemplary embodiment. In this embodiment, workflow error handler 123 includes a control system 202 and a memory 203. Control system 202 comprises any device, component, or system that is able to resume workflow processing of a print job at intermediate points or steps in the print workflow. Memory 203 generally stores job files 204 for the print job (e.g., print data files and/or job tickets), and may in some embodiments, store different versions of files 204 as workflow processing of the job is performed. Generally, files 204 for a print job may change during workflow processing of the print job. For example, PDL (Page Description Language) print data is rasterized into bitmaps and/or sheetsides, job tickets are updated with information regarding insert sheets, which type of media to use, etc.

Figure 3:
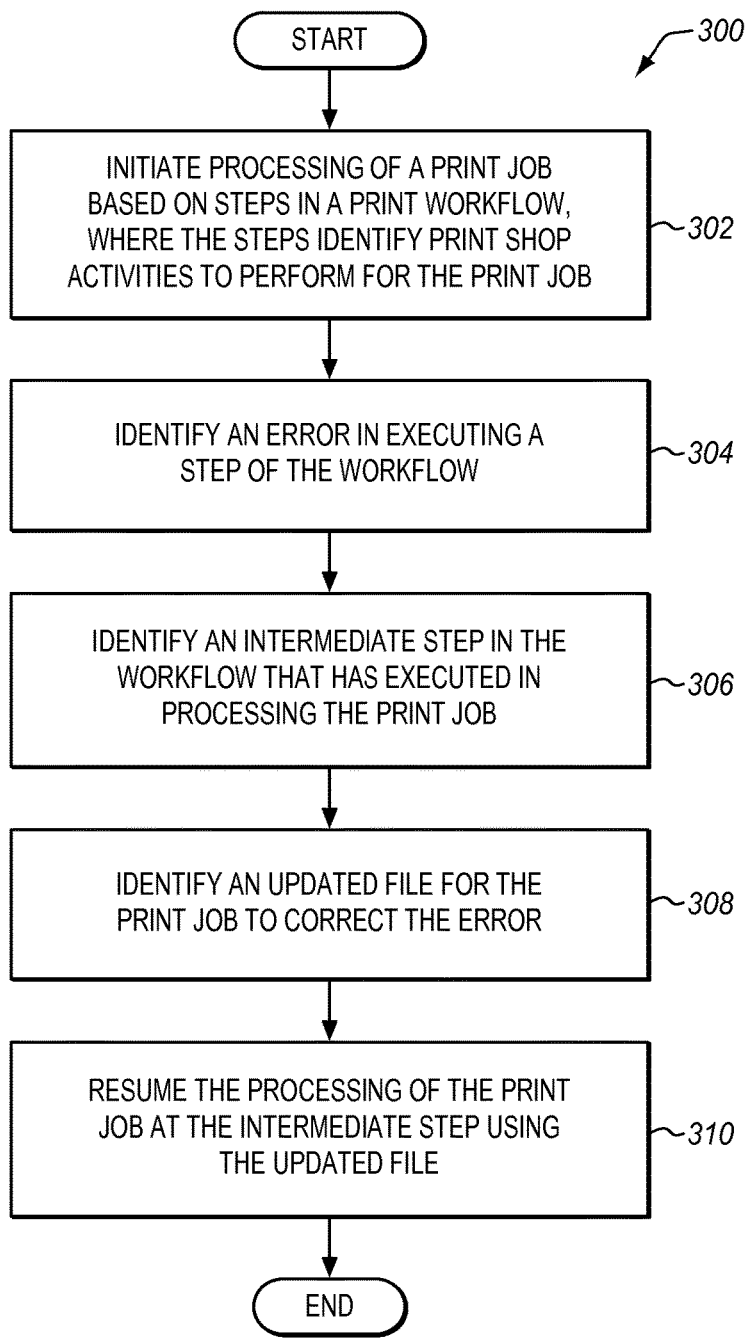
FIG. 3 is a flow chart illustrating a method for resuming the workflow processing of a print job at an intermediate step of a print workflow in an exemplary embodiment.

FIG. 3 is a flow chart illustrating a method 300 of resuming the workflow processing of a print job at an intermediate step of a print workflow in an exemplary embodiment. The steps of method 300 will be described with respect to control system 202 of FIG. 2, although one skilled in the art will understand that method 300 may be performed by other systems not shown. The steps of the method described herein are not all inclusive and may include other steps not shown. The steps may also be performed in an alternative order.

In step 302, control system 202 initiates processing of a print job based on steps in a print workflow. The print workflow includes steps that identify the print shop activities to perform for the print job. For example, the steps may indicate a preflight activity for the print job, customer credit verification, printing, post-print activity for the job (e.g., stapling, binding, mailing, shipping, etc.).

Figure 4:
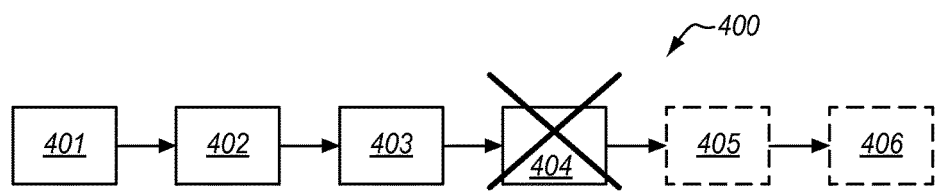
FIG. 4 is a block diagram illustrating a non-branching print workflow in an exemplary embodiment.

FIG. 4 is a block diagram illustrating a non-branching print workflow 400 in an exemplary embodiment. In this embodiment, workflow 400 does not include branches to facilitate error handling. Workflow 400 includes a number of steps 401-406 in a specific order. Generally, steps 401-406 define the activities that will be performed on the print job during processing of the job by workflow 400. Also, various workflow rules or other criteria may be defined for steps 401-406 and may generate error conditions during the processing of the print job. For example, if job file 204 is missing information regarding a font for printing the job, then an error condition may occur. In another example, if job file 204 is missing an email address or a website address for emailing/posting information regarding the job, then an error condition may occur. During processing of the print job by workflow 400, an error condition occurs. This is indicated as an 'X' marked across step 404 of workflow 400. However, the relative positions, number of steps, and error location illustrated in FIG. 4 is merely provided for the purposes of discussion.

Returning to FIG. 3, in step 304 control system 202 identifies an error in executing a step in a workflow during processing of a print job (e.g., an error in step 404 of workflow 400). In prior print workflow systems, an error would necessitate a restart of the job at the beginning of the print workflow after the error was resolved. For instance, if the error is a missing font, a font would be identified and the files for the job would be updated to correct the error. The job would then be restarted at the beginning of the workflow (e.g., step 401 of print workflow 400).

In step 306, control system 202 identifies intermediate steps in the print workflow that have executed in processing the print job. For example, print workflow 400 includes a first step 401, a last step 406, and intermediate steps 402-405. Intermediate steps 402-403 in the example have executed in processing the print job. Step 404 has executed with an error in processing the print job, and step 405 has not executed as of yet due to the error condition at step 404. Of the steps 402-404 that have executed, control system 202 identifies one of steps 402-404 as a resume point for processing of the print job. For instance, control system 202 may back up 2 steps and resume processing the print job at step 402. Control system 202 may back up 1 step and resume processing the print job at step 403. Or, control system 202 may resume processing of the print job at step 404, which was the step in this example that generated an error during processing of the print job. Selecting a resume point may be performed in a number of different ways as a matter of design choice. For instance, as job files change during the workflow processing of the print job, it may not be possible to resume processing at the step that generated the error. For instance, proof copies of a job may be reviewed and rejected. Previous steps may then be re-run to change insert sheets, perform preflight checks, and re-generate proof copies of the modified job. This is performed without re-submitting the job back to the beginning of the workflow.

In step 308, control system 202 identifies an updated file (e.g., one or more updated files 204) for the job. The updated file may be generated automatically, may be generated by an operator, etc. The file may be updated based on the error condition identified by control system 202. For instance, if the error condition is related to missing or incorrect information in the job, such as font information, then the updated file would include the missing information to correct the error. Also, the updated file may be a job ticket for the print job and/or a presentation file for the print job. One example of a presentation file is a Portable Document Format (PDF) file, which encapsulates a description of a document including the text, font, graphics, etc., utilized when displaying the document.

Figure 5:
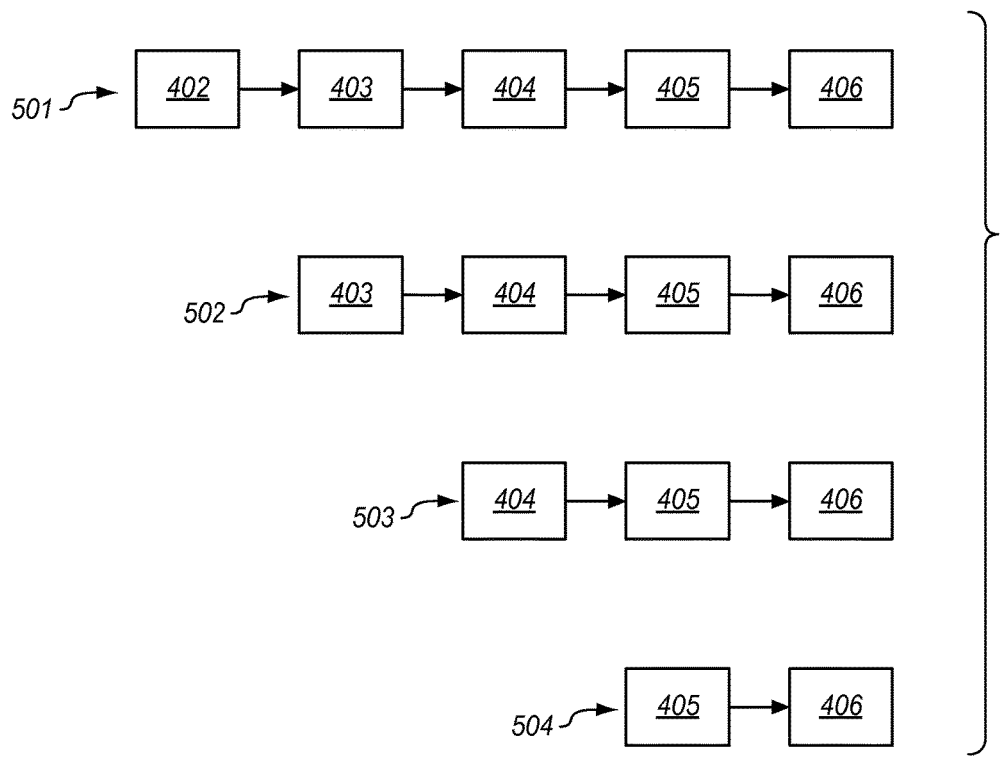
FIG. 5 is a block diagram illustrating a plurality of possible resume points for processing a print job using the print workflow of FIG. 4 in an exemplary embodiment.

In step 310, control system 202 resumes the processing of the print job at the intermediate step identified using the modified file(s). FIG. 5 is a block diagram illustrating a plurality of possible resume points 501-504 for print workflow 400 in an exemplary embodiment. As discussed, resuming the processing of workflow 400 may occur at different intermediate steps 402-405, if the steps had executed during the workflow processing of the job. For instance, in the example error illustrated for print workflow 400 (step 404), the possible resulting steps are illustrated as resume points 501-503. Resume point 504 would not be valid in this example because step 405 occurs after the error point of step 404. However, if the error condition occurred at either of steps 405-406, then resume point 504 in this case would be a valid place to resume processing of the print job using workflow 400.

In some embodiments, a print operator may be involved in the process of selecting where to resume processing for a particular print workflow. For instance, GUI 124 may illustrate one or more of the intermediate steps of a workflow that may be selected as a resume point (e.g., GUI 124 may illustrate one or more of steps 402-405, depending on where the error occurs in workflow 400). This may occur in cases where the print operator is involved in the process of modifying file(s) of the job to correct the error, or when the print operator has more knowledge about where job processing is more likely to resume successfully.

In other embodiments, changes may be made to one or more files in a job to correct an error, and the print operator maybe asked to indicate which version of the files to use when the processing of the job resumes. For instance, as steps of a workflow are executed and files in the print job change, temporal snapshots of the job files may be captured and stored. Thus, when a previously executed step is selected as a resume point for processing a job, GUI 124 may display information regarding the version information for the various job files for the job (e.g., files 204), and allow the print operator to select which versions of the files to use. This may provide more flexibility when the processing of print jobs at intermediate steps in a print workflow resumes.

Figure 6:
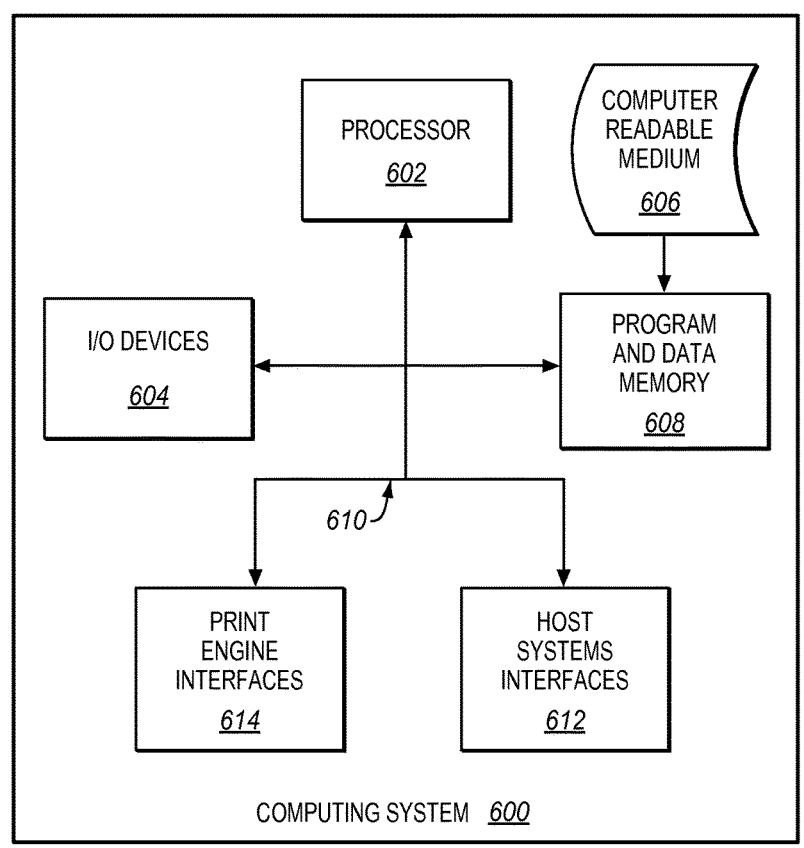
FIG. 6 is a block diagram illustrating a computer system operable to execute computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 600 in which a computer readable medium 606 may provide instructions for performing method 300 in an exemplary embodiment.

Furthermore, the invention can take the form of a computer program product accessible from a computer-usable or computer-readable medium 606 providing program code for use by or in connection with a computer or any instruction execution system. For the purposes of this description, a computer-usable or computer readable medium 606 can be any apparatus that can contain, store, communicate, propagate, or transport the program for use by or in connection with the instruction execution system, apparatus, or device.

The medium 606 can be an electronic, magnetic, optical, electromagnetic, infrared, or semiconductor system (or apparatus or device) or a propagation medium. Examples of a computer-readable medium 606 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution.

Input/output or I/O devices 604 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 612, or remote printers or storage devices through intervening private or public networks, such as through print engine interfaces 614. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A system comprising:
a control system operable to initiate processing of a print job based on steps in a print workflow, wherein the steps identify print shop activities to perform for the print job;
the control system is further operable to identify an error in executing a step of the print workflow, to identify an intermediate step in the print workflow that has executed in processing the print job, to identify an updated file for the print job to correct the error, and to resume processing of the print job at the intermediate step using the updated file.

2. The system of claim 1 wherein:
the control system is further operable to indicate to a user a plurality of intermediate steps that have executed in processing the print job, to receive a selection from the user of an intermediate step, and to resume processing of the print job at the intermediate step selected by the user utilizing the updated file.

3. The system of claim 1 wherein:
the control system is further operable to identify a previous version of the updated file, to determine which version to use to resume processing based on a selection from a user, and to resume processing of the print job using the version selected by the user.

4. The system of claim 1 wherein:
the control system is further operable to identify an updated job ticket for the print job to correct the error, and to resume processing of the print job at the intermediate step using the updated job ticket.

5. The system of claim 1 wherein:
the control system is further operable to identify an updated presentation file for the print job to correct the error, and to resume processing of the print job at the intermediate step using the updated presentation file.

6. The system of claim 1 wherein:
the print workflow is a non-branching workflow.

7. A method comprising:
initiating a processing of a print job based on steps in a print workflow, wherein the steps identify print shop activities to perform for the print job;
identifying an error in executing a step of the print workflow;
identifying an intermediate step in the print workflow that has executed in processing the print job;
identifying an updated file for the print job to correct the error; and
resuming the processing of the print job at the intermediate step using the updated file.

8. The method of claim 7 wherein:
identifying an intermediate step further comprises:
indicating to a user a plurality of intermediate steps that have executed in processing the print job; and
receiving a selection from the user of an intermediate step; and
resuming the processing further comprises:
resuming the processing of the print job at the intermediate step selected by the user utilizing the updated file.

9. The method of claim 7 wherein:
identifying the updated file further comprises:
identifying a previous version of the updated file; and
determining which version to use to resume processing based on a selection from a user; and
resuming the processing further comprises:
resuming the processing of the print job using the version selected by the user.

10. The method of claim 7 wherein:
identifying an updated file further comprises:
identifying an updated job ticket for the print job to correct the error; and
resuming the processing further comprises:
resuming the processing of the print job at the intermediate step using the updated job ticket.

11. The method of claim 7 wherein:
identifying an updated file further comprises:
identifying an updated presentation file for the print job to correct the error; and
resuming the processing further comprises:
resuming the processing of the print job at the intermediate step using the updated presentation file.

12. The method of claim 7 wherein:
the print workflow is a non-branching workflow.

13. A non-transitory computer readable medium embodying programmed instructions which, when executed by a processor, direct the processor to:
initiate a processing of a print job based on steps in a print workflow, wherein the steps identify print shop activities to perform for the print job;
identify an error in executing a step of the print workflow;
identify an intermediate step in the print workflow that has executed in processing the print job;
identify an updated file for the print job to correct the error; and
resume the processing of the print job at the intermediate step using the updated file.

14. The non-transitory computer readable medium of claim 13 wherein:
  instructions to identify an intermediate step further comprise instructions to:
    indicate to a user a plurality of intermediate steps that have executed in processing the print job; and
    receive a selection from the user of an intermediate step; and
  instructions to resume the processing further comprise instructions to:
    resume the processing of the print job at the intermediate step selected by the user utilizing the updated file.

15. The non-transitory computer readable medium of claim 13 wherein:
  instructions to identify the updated file further comprise instructions to:
    identify a previous version of the updated file; and
    determine which version to use to resume processing based on a selection from a user; and
  instructions to resume the processing further comprise instructions to:
    resume the processing of the print job using the version selected by the user.

16. The non-transitory computer readable medium of claim 13 wherein:
  instructions to identify an updated file further comprise instructions to:
    identify an updated job ticket for the print job to correct the error; and
  instructions to resume the processing further comprise instructions to:
    resume the processing of the print job at the intermediate step using the updated job ticket.

17. The non-transitory computer readable medium of claim 13 wherein:
  steps to identify an updated file further comprise instructions to:
    identify an updated presentation file for the print job to correct the error; and
  instructions to resume the processing further comprise instructions to:
    resume the processing of the print job at the intermediate step using the updated presentation file.

18. The non-transitory computer readable medium of claim 13 wherein:
  the print workflow is a non-branching workflow.

* * * * *